US011295257B2

(12) United States Patent
Asthana et al.

(10) Patent No.: US 11,295,257 B2
(45) Date of Patent: Apr. 5, 2022

(54) COGNITIVE PRIORITIZATION FOR REPORT GENERATION

(71) Applicant: INTERNATIONAL BUSINESS MACHINES CORPORATION, Armonk, NY (US)

(72) Inventors: Shubhi Asthana, Santa Clara, CA (US); Valeria Becker, La Plata (AR); Kugamoorthy Gajananan, Toshima-ku (JP); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 15/954,754

(22) Filed: Apr. 17, 2018

(65) Prior Publication Data

US 2019/0318287 A1   Oct. 17, 2019

(51) Int. Cl.
*G06Q 10/06* (2012.01)
*G06Q 10/10* (2012.01)
(Continued)

(52) U.S. Cl.
CPC ..... *G06Q 10/06316* (2013.01); *G06F 3/1296* (2013.01); *G06N 5/04* (2013.01); *G06N 20/00* (2019.01); *G06Q 10/10* (2013.01)

(58) Field of Classification Search
CPC .. G06Q 10/06316; G06Q 10/10; G06N 20/00; G06N 5/04; G06F 3/1296; Y10S 84/02; Y10S 83/927
See application file for complete search history.

(56) References Cited

U.S. PATENT DOCUMENTS 7,509,671 B1 *   3/2009   Bedell ................... G06F 9/5038
                                                                    726/6
8,056,100 B2 *   11/2011  Herz .................... H04N 21/222
                                                                    725/46
(Continued)

FOREIGN PATENT DOCUMENTS

WO   WO-2012044320 A1 *   4/2012   ............. G06F 15/16
WO      2014154658 A1      10/2016

OTHER PUBLICATIONS

Yu, Lean, Shouyang Wang, and K. K. Lai. "A rough-set-refined text mining approach for crude oil market tendency forecasting." International Journal of Knowledge and Systems Sciences 2.1 (2005): 33-46. (Year: 2005).*

(Continued)

*Primary Examiner* — Patricia H Munson
*Assistant Examiner* — Thea Labogin
(74) *Attorney, Agent, or Firm* — Edell, Shapiro & Finnan, LLC

(57) ABSTRACT

A system for cognitive prioritization for report generation may include a processor and a memory cooperating therewith. The processor may be configured to accept a request for a new report from a user, the request having a user profile importance associated therewith and generate a predicted completion time for the new report based upon a historical completion time prediction model based upon historical data for prior reports. The processor may be configured to generate a predicted importance of the new report based upon a historical importance prediction model based upon the historical data for prior reports and determine a combined predicted importance based upon the user profile importance and the predicted importance. The processor may also be configured to generate a prioritization of the new report among other reports based upon the predicted (Continued)

completion time and the combined predicted importance and generate the new report based upon the prioritization.

18 Claims, 4 Drawing Sheets

(51) Int. Cl.
    *G06F 3/12*            (2006.01)
    *G06N 5/04*          (2006.01)
    *G06N 20/00*        (2019.01)

(56) References Cited

U.S. PATENT DOCUMENTS

| | | | | |
|---|---|---|---|---|
| 8,713,023 | B1* | 4/2014 | Cormack | G06N 20/00 |
| | | | | 707/740 |
| 9,483,732 | B1 | 11/2016 | Milakovich | |
| 9,531,604 | B2* | 12/2016 | Akolkar | H04L 47/70 |
| 2002/0063877 | A1* | 5/2002 | Lucivero | G06F 3/12 |
| 2003/0093670 | A1* | 5/2003 | Matsubayashi | G06F 21/608 |
| | | | | 713/168 |
| 2011/0264649 | A1* | 10/2011 | Hsiao | G06N 5/022 |
| | | | | 707/722 |
| 2014/0358608 | A1 | 12/2014 | Bianchi et al. | |
| 2017/0032460 | A1* | 2/2017 | Szollar | G06Q 40/025 |

OTHER PUBLICATIONS

Garg, Vipul, Workload Analysis and Demand Prediction for the HP ePrint Service, IFIP/IEEE international Symposium on Integrated Network Management (IM2013): Experience Session Paper p. 1054-1059 (Year: 2013).*

IBM; "IBM Watson: Next Generation Cognitive System"; IBM Corporation, IBM Software Whitepaper, IBM Solutions; Sep. 2012.

Anonymously; "Document prioritization by measuring its cognitive authorship effort"; http://ip.com/IPCOM/000247882D; Oct. 9, 2016.

Anonymously; "Cognitive Aggregation/Prioritization of Real-time Accomplishments"; http://ip.com/IPCOM/000246321D; May 30, 2016.

Grace Period Disclosure under 35 U.S.C. § 102(b)(1)(A): Asthana et al.; "A Cognitive Prioritization for Reports Generated in Resource Constrained Applications"; IEEE 14th International Conference on Services Computing; Jun. 25, 2017.

* cited by examiner

COGNITIVE PRIORITIZATION FOR REPORT GENERATION

STATEMENT REGARDING PRIOR DISCLOSURES BY THE INVENTORS

The following disclosure is submitted under 35 U.S.C. § 102(b)(1)(A): "A Cognitive Prioritization for Reports Generated in Resource Constrained Applications"; Shubhi Asthana, Aly Megahed, Valeria Becker, Kugamoorthy Gajananan; Jun. 25, 2017; IEEE 14th International Conference on Services Computing.

BACKGROUND

The present invention relates to computer systems, and more specifically, to cognitive prioritization for report generation. In many applications, users are given the ability to generate reports combining different data entities/attributes out of either the data stored in the application, data calculated on-the-fly, or both. These applications could be web applications, applications deployed in the cloud, or otherwise. In multiple business contexts, such reports may be relatively important to users to make business decisions, perform analyses on different parts of the business, make better pricing decisions, etc.

One example is a user report generated in a banking sector application detailing investment portfolios. Another example is a report of prior service contracts from a contract tracking application. Such reports are typically customized, where the user is given the ability to generate a report after doing different filter selections. For example, in the latter example of a service contract, the user can choose to request a report for a particular geographical region(s), a particular client sector(s), a particular service(s), etc., depending on a desired analysis.

SUMMARY

A system for cognitive prioritization for report generation may include a processor and a memory cooperating therewith. The processor may be configured to accept a request for a new report from a user, the request having a user profile importance associated therewith and generate a predicted completion time for the new report based upon a historical completion time prediction model based upon historical data for prior reports. The processor may be configured to generate a predicted importance of the new report based upon a historical importance prediction model based upon the historical data for prior reports and determine a combined predicted importance based upon the user profile importance and the predicted importance. The processor may also be configured to generate a prioritization of the new report among other reports based upon the predicted completion time and the combined predicted importance and generate the new report based upon the prioritization.

The historical data for prior reports may include metadata. The new report may have metadata associated therewith, for example.

The historical completion time prediction model may include a multi-variable regression model trained on historical reports each having associated completion times. The attributes of the multi-variable regression model may include user-chosen values for each of a plurality of usable filters for generation of the new report, available system resources for the new report generation, and demand queue size at a time of the request for the new report, for example.

The historical importance prediction model may include a text mining model trained on historical textual user input and associated corresponding importance of the new report. The user profile importance may be learned, for example, and may include a user's organization role as an input or is learned. The processor may be configured to determine the combined predicted importance based upon the user profile importance and the predicted importance based upon one of an ensemble function and an aggregation function, for example.

The processor may be configured to add delay to the predicted completion time for the new report. The processor may be configured to determine the delay based upon a number of attempts of the user to at least one of misstate an importance of the new report and misstate an importance of prior reports. The processor may be configured to generate the prioritization of the new report by calculating an importance weight for the new by combining a reciprocal of the predicted completion time for the new report and the predicted importance, for example.

A method for cognitive prioritization for report generation may include using a processor cooperating with a memory to accept a request for a new report from a user, the request having a user profile importance associated therewith and generate a predicted completion time for the new report based upon a historical completion time prediction model based upon historical data for prior reports. The method may also include using the processor to generate a predicted importance of the new report based upon a historical importance prediction model based upon the historical data for prior reports and determine a combined predicted importance based upon the user profile importance and the predicted importance. The method may further include using the processor to generate a prioritization of the new report among a plurality of other reports based upon the predicted completion time and the combined predicted importance, and generate the new report based upon the prioritization.

A computer readable medium for cognitive prioritization for report generation includes computer executable instructions that when executed by a processor cause the processor to perform operations. The operations may include accepting a request for a new report from a user, the request having a user profile importance associated therewith, generating a predicted completion time for the new report based upon a historical completion time prediction model based upon historical data for prior reports, and generating a predicted importance of the new report based upon a historical importance prediction model based upon the historical data for prior reports. The operations may also include determining a combined predicted importance based upon the user profile importance and the predicted importance, generating a prioritization of the new report among a plurality of other reports based upon the predicted completion time and the combined predicted importance, and generating the new report based upon the prioritization.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
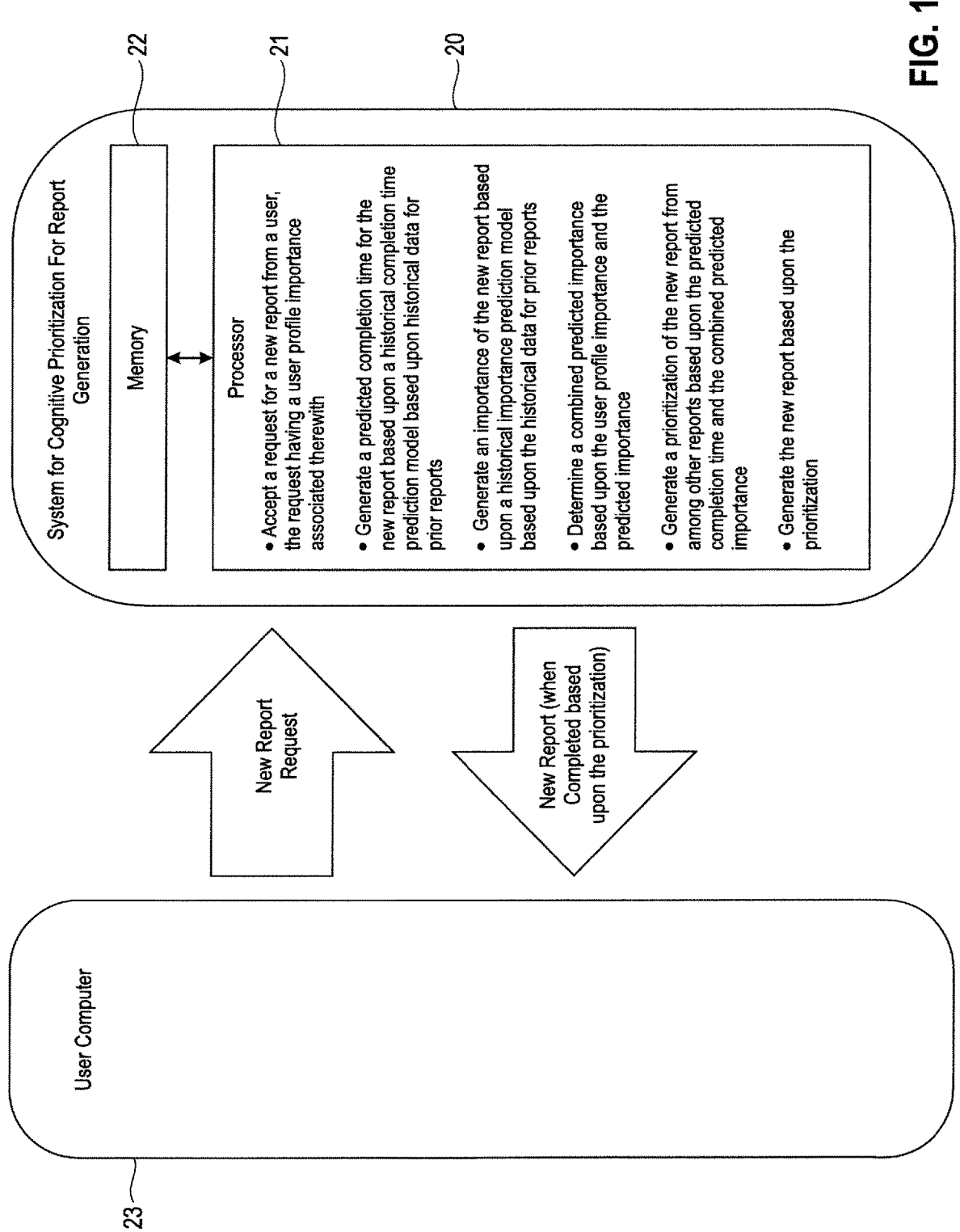
FIG. 1 is a schematic diagram of a system for cognitive prioritization for report generation in accordance with an embodiment.
Figure 2:
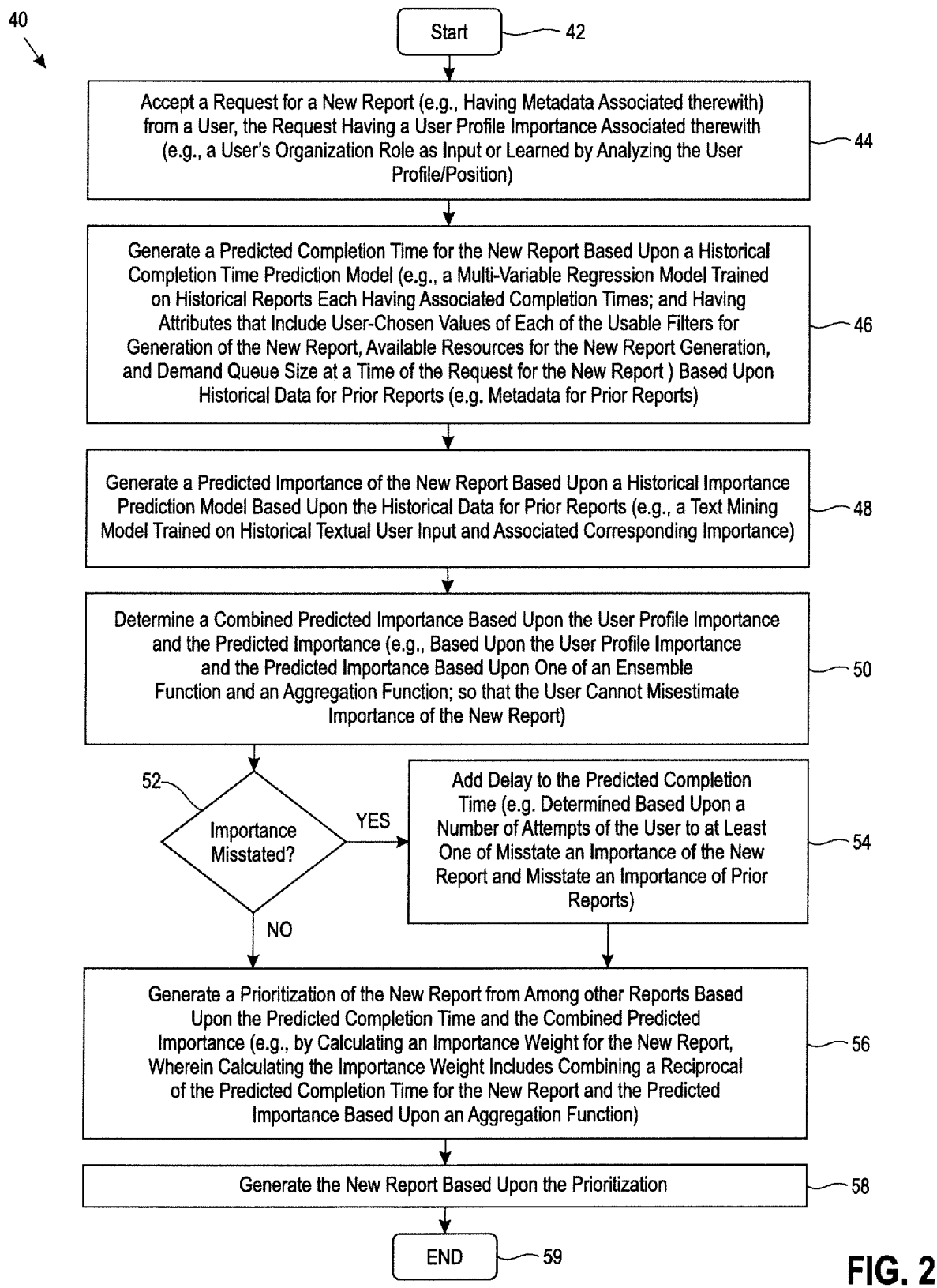
FIG. 2 is a flow diagram of operation of the system for cognitive prioritization for report generation of FIG. 1.

Referring initially to FIG. 1 and the flowchart 40 in FIG. 2, beginning at Block 42, a system for cognitive prioritization for report generation 20 includes a processor 21 and a memory 22 cooperating therewith. The processor, at Block 44, accepts a request for a new report from a user, for example, from a user computer 23, the request having a user profile importance associated therewith. The new report may have metadata associated therewith. The user profile importance may include a user's organization role, for example, an executive, a manager, etc., which may be provided as an input or learned by the system 20.

The processor 21 generates a predicted completion time for the new report based upon a historical completion time prediction model (Block 46) based upon historical data for prior reports (e.g., including metadata). The historical completion time prediction model may include a multi-variable regression model trained on historical reports each having associated completion times so that the processor generates the predicted completion time for the new report based upon the multi-variable regression model. Attributes of the multi-variable regression model may include user-chosen values for each of a plurality of usable filters for generation of the new report, available system resources for the new report generation and demand queue size at a time of the request for the new report, for example. Of course, there may be other and/or additional attributes of the multi-variable regression model.

The processor 21 also generates a predicted importance of the new report based upon a historical importance prediction model (Block 48). The historical importance prediction model may be based upon the historical data for prior reports. The historical importance prediction model may include a text mining model that is trained on historical textual user input and associated corresponding importance of the new report so that the processor 21 generates the predicted importance for the new report based upon the text mining model.

At Block 50, the processor 21 determines a combined predicted importance based upon the user profile importance and the predicted importance. The combined predicted importance may be determined based upon the user profile importance and the predicted importance based upon one of an ensemble function or method and an aggregation function. The combined predicted importance may also be determined so that the user cannot misstate an importance of the new report or "play the system" as will be appreciated by those skilled in the art. Thus, the processor 21, if the user misstates the importance of the new report may add delay to the predicted completion time for the new report (Block 54) when it is determined that the user is misstating the importance of the new report (Block 52). The delay may be based upon a number of attempts of the user to misstate the importance of the new report. For example, the delay may be compounded based upon the number of attempts.

A prioritization of the new report among a plurality of other reports is generated at Block 56 based upon the predicted completion time and the combined predicted importance. More particularly, the processor 21 may generate the prioritization of the new report by calculating an importance weight for the new report. Calculating the importance weight may include combining a reciprocal of the predicted completion time for the new report and the predicted importance, for example, based upon an aggregation function.

At Block 58 the processor 21 generates the new report based upon the prioritization. The method ends at Block 59.

Figure 3A:
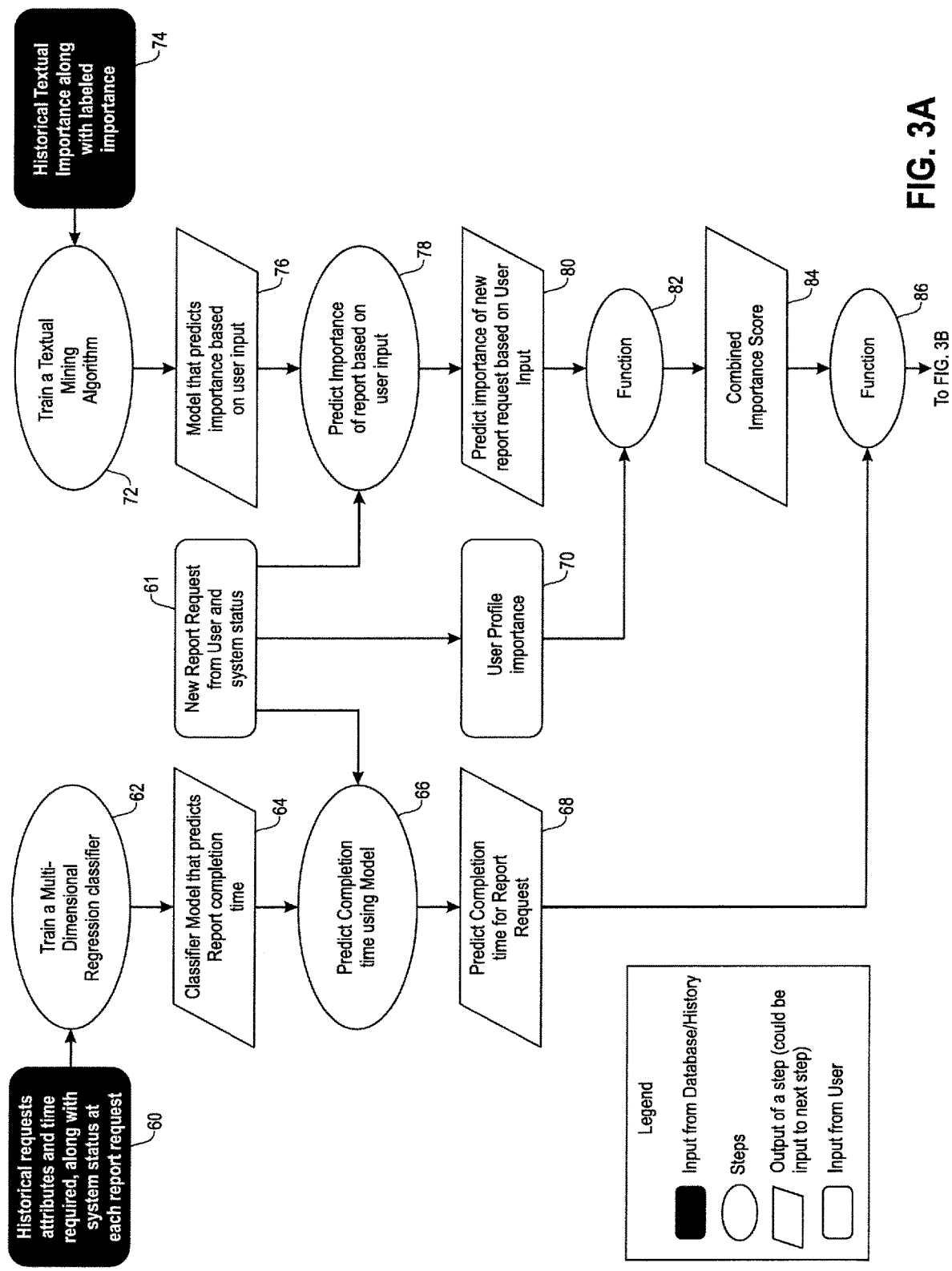
FIGS. 3a and 3b are a schematic diagram of operation of a system for cognitive prioritization for report generation with respect to inputs and outputs in accordance with an embodiment.
Figure 3B:
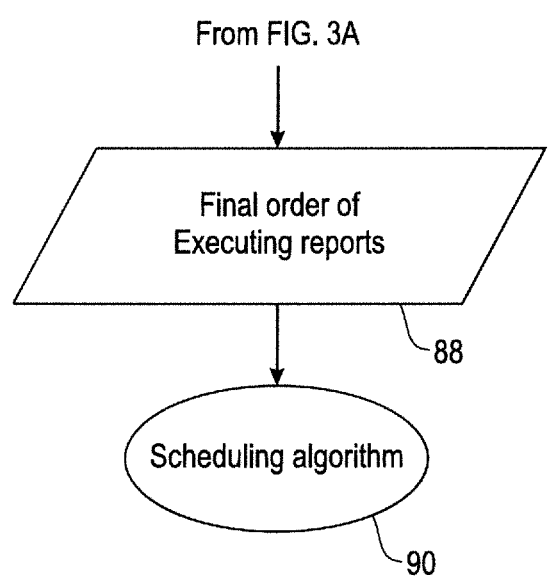

Referring now additionally to FIGS. 3a and 3b, further details of the system for cognitive prioritization for report generation 20 will now be described. As background, applications that generate reports are typically run or deployed in resource constrained environments. Examples of these resources are computing and memory capacities for an application running in the cloud. Existing approaches perform scheduling of workload in resource constrained applications and for cloud computing. Nevertheless, it may be particularly vital for many applications to prioritize the importance of different requested reports before scheduling them. Most existing approaches assume that such prioritization is given and/or is straightforward to come up with. However, generating a reasonable prioritization may be particularly challenging. That is when one puts into account two real considerations. The first of which is the predicted report completion time. If a method does not consider that, then it might give a high priority to a report that takes a long time to be generated (and typically a lot of the computing/memory resources, for example) causing the blockage of other reports that may be of higher urgency. Also, it could be unfair/inconvenient for users generating small reports to wait for so long until large reports are generated, assuming that all reports are of equal urgency. Additionally, that urgency of the reports as can be inferred by a user-input and/or the user's profile, is another vital thing to put in consideration when prioritizing reports. That is, a report requested by the chief executive officer (CEO) or a high-profile executive should be of higher priority than one generated by an individual contributor for some general analysis. Similarly, a report generated to be used with an urgent meeting with clients is of higher priority than an internal periodic report.

However, these considerations have not been implemented into a cognitive prioritization approach in existing approaches. Accordingly, the embodiments described herein describe effectiveness using a cognitive prioritization approach. In an embodiment, the report completion time is first predicted via a predictive analytics model that uses the report attributes as predictive features. In addition, text mining for the user-input text on the reason for requesting the report is also performed, as well as analysis of the user-profile importance to label the importance of the report. The outputs of both models are then combined to come up with a ranking/prioritization of the reports to be generated at any time period.

The embodiments described herein include a four-step approach that aim at understanding the importance of each report. In particular, FIGS. 3a and 3b illustrates the methodology, where the inputs to the model are the historical data of the reports generated in the past along with their labeled importance and completion times. Such data include the report structured attributes, unstructured user-input about the report importance, and user-profile. Report structured attributes are the values chosen by the users who requested these reports for each report criterion (Block 61). Report criteria may include geography, range of portfolios, and range of time for these investments, in the above-described banking example. In the service contracts example, above, attributes may be the geographies of the contracts, type of services included, client industry, etc. The unstructured data is the user-input free form text on the reason behind requesting the report.

Two different models are then trained (these are the first two steps). The first step of which is a predictive analytics model that uses the structured data to predict the report completion times (Blocks 60, 62, 64, 66). The second model is a text mining model that predicts the importance of the report based on the user-input (Blocks 72, 74, 76, 78). Next, the two models are applied to the corresponding data of the new reports to be prioritized (Blocks 68, 80). In a third step, the output of the text mining model is combined with the user-importance (Block 70) via some aggregation function (Block 82) to get to the final prediction of the report importance (Block 84). Then, in a fourth step, this importance prediction is combined with the predicted report completion time as predicted by the former model (Block 86) to get to a final prioritization of the new reports (Block 88). Then, the prioritization is inputted to any scheduling algorithm (Block 90) so that the reports are generated.

Further details of each step in the above-described approach will now be described. With respect to predicting report completion time, the model is trained using historical data of report attributes (typically, values chosen by the user for each filter that the user is allowed to choose) as well as the actual time it took to generate these reports (Block 60). The historical data can be used to train a predictive model (Block 62) based on multi-variable regression model to use these attributes and predict the completion time (Block 64). After training such model, the model can be used for new requests in future, using their attributes to predict their completion times (Blocks 66, 68). Different types of regression models can be used. Examples include multi-variable linear models, Lasso regression models, and/or other models, as will be appreciated by those skilled in the art.

With respect to using text mining to predict the importance of requested reports, users who submit the requests are typically required to input a free-form (un-structured) text in the form of a comment about the reason for requesting the report (Block 74). The historical training data for reports generated in the past also comprises of the user-input text and their importance (e.g., a label of 1 to 3, where 1 is for reports of least important, 2 is for reports of moderate importance, and 3 is for very critical/urgent reports) (Block 72). Examples of user inputs along with corresponding labels are:

"Urgent meeting with client", labeled 2;
"Periodic monthly report", labeled 1; and
"Report requested by CEO", labeled 3 . . . etc.

In one exemplary embodiment, each comment is then converted to a bag of words. The text is transformed to get label indexers, which fit on the whole dataset. In addition, feature indexers are created, which automatically identify categorical features and index them. A classification model is then built for comment classification that is trained with such historical data to predict the report importance. The model can then be used to predict the importance of a future new request given the user's unstructured comment (Blocks 76-80). Different text mining algorithms and machine learning classifiers can be used for this purpose. In the embodiments (as described below), for example, the term frequency-inverse document frequency TF-IDF technique and the decision tree classifier is used. TF-IDF is a text mining technique that shows relatively how important a word is to a document in a collection. The importance of a word increases proportionally to the number of times it appears in the document.

In one exemplary embodiment, with respect to calculating the combined importance score of requests (Block 84), since users might over or under estimate the importance of their reports in the free-form text that they are required to input, incorporating other attributes that influence importance may be considered imperative. Thus, some user profile importance is incorporated along with the predicted labeled importance of reports to be generated. An aggregate score is computed by using a weighting function that accounts for the importance of the comments with the actual roles of the users. This weighting function uses the score generated from the previous step as the input and generates the aggregate score of the new request. The weighting function may be a relatively simple function such as taking the minimum of the two weights, their maximum, average, etc., or it could be a weighted function where a weight w is given to the predicted report importance and a weight 1-w is given to the user profile, where w would be a user-input parameter between 0 and 1. Other advanced ensemble techniques can be used as well for this aggregation. Lastly, the aforementioned weight w may also be learned from historical data via training a model on historical data with the objective of minimizing the prediction error that could learn the optimal value of w that fits this objective.

In one exemplary embodiment, with respect to calculating the final order of executing reports (Block 88), the completion time for each report and the combined importance of that report has already be estimated. Here, an ordering function is applied to combine two estimates; and come up with the final score of that report. These scores are then used to sort the reports. A sorting function is used where a weight w' is applied to the importance and a weight 1-w' to the reciprocal of the estimated completion time, where w' is a given user input weight between 0 and 1. Note that the 'reciprocal' of the predicted report completion time is used to penalize reports that take too long to be generated. Reports are then sent for scheduler's processing queue based on this final computed order (Block 90).

A proof-of-concept implementation of the embodiments will now be described. It should be understood that an objective may be to provide such implementation of our cognitive prioritization approach rather than providing or showing a better scheduling result. Starting with explaining a real-world application as follows: Information technology (IT) service providers compete to win highly valued service contracts. Typically, clients submit a request for proposals and then providers prepare solutions, price them, and then use them to negotiate with the clients trying to win these deals. A repository of such real historical IT deals was created within an application that prices these deals. In this application, users can request a variety of deals. For example, they can request historical won deals, historical lost ones, currently-negotiated deals, etc. Users can also request reports for offerings included in particular deals, resources used in each deal, etc. For each type of deal, the user is given the ability to choose multiple attributes of the deal as described below. Thus, the objective is to apply the embodiments of the method for prioritizing these reports that include specific deals from the history or the present. It is worth mentioning that the method of predicting the importance of these reports to prioritize and then schedule their generation, is generally irrelevant to predicting the probability of wining the deals (i.e., whether any particular deal is expected to be won or not).

An evaluation setup for the different components of the method embodiments described herein will now be described. Numerical results are reported that show the efficacy of our approach described above. To set up the evaluation, a set of 1000 reports was selected from the aforementioned repository at random and with some of the reports that were incomplete out of which nothing could have been learned by the models being removed. The remaining 871 reports were used for the analysis. The chosen reports included all the required structured and unstructured data for the method embodiments described above. The data was structured by setting up meta-information and encoding dates to number of seconds and minutes. These dates were the data ranges for deals to include in each report as requested by the users. The evaluation was divided into two main parts. In the first part, a regression model was built for predicting the report completion times. In the second part, the comments inputted by the users were analyzed, defining the reason for requesting the report/its priority, using textual analytics and predict the priority of the reports. Additionally, for illustrating the outcome of our method, in a third part, the predictions of the priority of the reports were combined together with the predicted completion time to come up with a single score and rank the reports. The results for each of the three parts are provided below.

With respect to predicting report completion times, for each report, its meta-data was extracted and used for our model features. These data are: the type of the report (historical deals, current deals, or historical resources), the number of days for which report is requested for, which geographies it was requested for, and the kind of requested deals (either all deals or only the ones uploaded by the requested user). These are the attributes typically chosen by a user when the user requests a report. Table 1, below shows an excerpt of the dataset of these attributes and completion times.

Scikit-learn, an open source python machine learning library, was used to implement the regression models. Multiple regression models were tried (e.g., Linear, Lasso, Elastic Net, Ridge, as well as Multi-Task Elastic Net Regression). For each model, the data was divided into training and a testing sets, trained the model on the training set, used the trained model to predict the completion times for the testing set, and then calculated different metrics to evaluate which model is best. Creating a separate model for each report type separately as well as creating one model for all deal types (and using the deal type as a feature) was also attempted. A k-fold cross validation was performed for all of the experiments to prevent over-fitting, with k=10.

TABLE 1

Excerpt of the Dataset of Report Attributes and Completion

| Report Type | Geography | Deal Status | Number of days | Report Completion Time (in Seconds) |
|---|---|---|---|---|
| Historical Deals | Global | User's Deals Only | 31 | 52 |
| Current Deals | Asia-Pacific | User's Deals | 6 | 213 |
| Historical Deal Resources | Global | Only All Deals | 31 | 569 |

Table 2, below gives the root mean square error (RMSE) which is the most commonly used metric to assess the accuracy of regression models, number of data points used in training dataset, and number of data points used in testing dataset for different kinds of report. These results are for the Linear and the Lasso models, which had the best (similar) results in the present application, where a separate model was built for each report type.

After analyzing the coefficients for each feature in regression model, it was found that there is a high correlation between the range of the number of days between which a report is requested and the time it took to generate the report.

TABLE 2

Results for Different Kinds of Reports

| Type of Report | RMSE (in Seconds) | # of Training Data Points | # of Testing Data Points |
|---|---|---|---|
| Historical Deals | 9.67 | 361 | 90 |
| Current Deals | 6.82 | 248 | 62 |
| Historical Deal Resources | 0.92 | 88 | 22 |

Also, it was found that the range of the number of seconds to generate each report type is quite different. This justifies the above results that the system 20 and method embodiments described herein are better off building a prediction model for each report type separately rather than collectively.

With respect to predicting the priority of reports using textual mining, when users select the attributes/filters for generating a report, they also input a free-form text/comment indicating why they are requesting this report/what its priority is. Note that the system 20 was designed to require comments from users, indicating the urgency/importance of the reports they are requesting, rather than choosing a numerical importance, for example, because of some other design reasons related to analyzing the claimed reasons for report importance, among others. Reports are labeled 1, 2 or 3, where 1 is for least critical reports, 2 is for reports of medium criticality, and 3 is for most critical ones. This training data was labeled by crowd-sourcing manual labeling. A textual analytics model is trained to try to predict such labels. Table 3, below, illustrates a sample of this user-input.

The model was tested using the comments and their label, and evaluated it using Apache Spark, an open-source cluster-computing framework. The comments were evaluated using different machine learning classifiers, namely Naïve Bayes, Decision Tree and Logistic Regression. The Decision Tree classifier was used as it showed an average accuracy increase of 2% over the other classifiers that were tried.

TABLE 3

Examples of Comments and the Labels of Importance of Report

| Number | Comment | Importance |
|---|---|---|
| 1. | It is critical for tomorrow's meeting | Critical (Label: 3) |
| 2. | Preparing an update for next team meeting | Medium (Label: 2) |
| 3. | Please consider this report as low priority | Uncritical (Label: 1) |
| 4. | I need the report as soon as possible | Critical (Label: 3) |
| 5. | It is not an urgent request | Uncritical (Label: 1) |

For Text mining and transformation of comments, tests were conducted using both TF-IDF and count vectorizer and found that TF-IDF had 9% better accuracy than the count vectorizer. Table 4, below shows the best results that were achieved using the Decision Tree classifier and the TF-IDF text mining transformation. Note that, given the number of users in our application and the number of requested reports, the training dataset is not (and may probably never be) large enough to construct a deep learning framework as one of the currently leading frameworks in this context.

TABLE 4

Results for Decision Tree Classification Using TF-IDF Text Mining Transformation

| Precision | 0.86760 |
|---|---|
| Recall | 0.804651 |
| Accuracy | 0.84033 |

Table 5, below, shows an example of twenty test comments that were processed using the Decision Tree and TF-IDF algorithms. It compares the predicted label with the actual label for each comment.

Next, the description of how this algorithm works will be described: Each word from the set of comments in the training dataset was taken and evaluated against the corpus of comments. One hundred twenty unique terms/words were found to be most significant in predicting the label. By indicating that these one hundred twenty words were the relevant ones, irrelevant words like "a", "an", "the", "he", "she" etc. were removed. Within the TF-IDF technique, each word was given a weight w that depends on the number of times it occurred in the comments. This vector form of words is then used by the classifier in assessing the test comments and scoring their words so that the labels of these test comments are predicted/classified. If a test comment has a new word that had not been weighted previously in the training phase, the model would not predict the correct label. Hence, in Table 5, some differences in predicted and actual labels are shown.

With respect to calculating the combined importance score of request, a weighting function is used to evaluate the numerical prediction of completion of each report together with the priority of the report indicated by the user. A scheduling algorithm uses the order selected based on the weighted importance of each numerical prediction with the priority and forms a processing queue with the reports. This processing queue is then put in the scheduler to be executed and finally reports are generated for the users.

TABLE 5

Test Results from Twenty Comments Showing Predicted Values versus Actual Ones

| Predicted | Label | Comments |
|---|---|---|
| 2 | 2 | I need this for assessment in a new proposal |
| 3 | 2 | I need this report for discussion soon |
| 3 | 2 | I need this report to analyze the deals |
| 3 | 2 | Needed for a comparison of a new solution |
| 2 | 2 | Please consider this report as medium priority |
| 2 | 2 | Preparing an update for next team meeting |
| 3 | 3 | I have a meeting with an executive |
| 3 | 3 | I have a review with an executive |
| 3 | 3 | I need the report as soon as possible |
| 3 | 3 | I need the report urgently |
| 3 | 3 | I need this report right away |
| 3 | 3 | It is an essential report for today's discussion |
| 3 | 3 | It is critical for tomorrow's meeting |
| 3 | 3 | It is really critical for a presentation tomorrow |
| 3 | 3 | Please consider this report as high priority |
| 3 | 3 | Showing results to an executive |
| 3 | 3 | This report is very urgent |
| 3 | 1 | Checking the difference among GEOs |
| 1 | 1 | Checking what information it contains |
| 1 | 1 | I don't need the report right away |

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for cognitive prioritization for report generation comprising:
   a processor and a memory cooperating therewith, the processor configured to:
      accept a request for a new report from a user, the request having a user profile importance associated therewith and a user comment indicating a reason for requesting the new report;
      generate a predicted completion time for the new report by a historical completion time prediction model trained using historical data for prior reports;
      generate a predicted importance of the new report based upon the reason for requesting the new report by a historical importance prediction model including a text mining model trained using the historical data for prior reports, wherein the historical data for prior reports includes user comments indicating reasons for requesting the prior reports and corresponding labeled importance;

determine a combined predicted importance based upon the user profile importance and the predicted importance;
determine that the user misstated importance of the new report in the reason for requesting the new report and adjust the predicted completion time for the new report to lower a prioritization of the new report by:
determining a number of attempts of the user to misstate importance of the new report and the prior reports in the reason for requesting the new report in the user comment for the new report and in the reasons for requesting the prior reports in the user comments for the prior reports;
determining a delay based on the number of attempts of the user to misstate importance of the new report and the prior reports, wherein the delay increases as the number of attempts increases; and
adding the delay to the predicted completion time to indicate a later time for completion of the new report;
generate the prioritization of the new report among a plurality of other reports based upon the predicted completion time and the combined predicted importance; and
control wait times for users for the report generation according to report urgency, wherein controlling the wait times includes:
using differing amounts of computing and memory resources of the processor and the memory for the report generation in a resource constrained environment having computing and memory resource capacities, wherein the amount of computing and memory resources used is according to an order of the prioritization of the new report and the plurality of other reports; and
generating the new report and the plurality of other reports in the resource constrained environment in the order according to the prioritization using the differing amounts of the computing and memory resources.

2. The system of claim 1 wherein the historical data for prior reports comprises metadata of prior reports.

3. The system of claim 1 wherein the new report has metadata associated therewith.

4. The system of claim 1 wherein the historical completion time prediction model comprises a multi-variable regression model trained on historical reports each having associated completion times.

5. The system of claim 4 wherein attributes of the multi-variable regression model comprise user-chosen values for each of a plurality of usable filters for generation of the new report, available system resources for the new report generation, and demand queue size at a time of the request for the new report.

6. The system of claim 1 wherein the user profile importance comprises a user's organization role as an input or is learned.

7. The system of claim 1 wherein the processor is configured to determine the combined predicted importance based upon the user profile importance and the predicted importance based upon one of an ensemble function and an aggregation function.

8. The system of claim 1 wherein the processor is configured to generate the prioritization of the new report by calculating an importance weight for the new report by combining a reciprocal of the predicted completion time for the new report and the predicted importance.

9. A method for cognitive prioritization for report generation comprising:
using a processor cooperating with a memory to:
accept a request for a new report from a user, the request having a user profile importance associated therewith and a user comment indicating a reason for requesting the new report;
generate a predicted completion time for the new report by a historical completion time prediction model trained using historical data for prior reports;
generate a predicted importance of the new report based upon the reason for requesting the new report by a historical importance prediction model including a text mining model trained using the historical data for prior reports, wherein the historical data for prior reports includes user comments indicating reasons for requesting the prior reports and corresponding labeled importance;
determine a combined predicted importance based upon the user profile importance and the predicted importance;
determine that the user misstated importance of the new report in the reason for requesting the new report and adjust the predicted completion time for the new report to lower a prioritization of the new report by:
determining a number of attempts of the user to misstate importance of the new report and the prior reports in the reason for requesting the new report in the user comment for the new report and in the reasons for requesting the prior reports in the user comments for the prior reports;
determining a delay based on the number of attempts of the user to misstate importance of the new report and the prior reports, wherein the delay increases as the number of attempts increases; and
adding the delay to the predicted completion time to indicate a later time for completion of the new report;
generate the prioritization of the new report among a plurality of other reports based upon the predicted completion time and the combined predicted importance; and
control wait times for users for the report generation according to report urgency, wherein controlling the wait times includes:
using differing amounts of computing and memory resources of the processor and the memory for the report generation in a resource constrained environment having computing and memory resource capacities, wherein the amount of computing and memory resources used is according to an order of the prioritization of the new report and the plurality of other reports; and
generating the new report and the plurality of other reports in the resource constrained environment in the order according to the prioritization using the differing amounts of the computing and memory resources.

10. The method of claim 9 wherein the historical completion time prediction model comprises a multi-variable regression model trained on historical reports each having associated completion times.

11. The method of claim 10 wherein attributes of the multi-variable regression model comprise user-chosen values for each of a plurality of usable filters for generation of the new report, available system resources for the new report generation, and demand queue size at a time of the request for the new report.

12. The method of claim 9 wherein using the processor comprises using the processor to determine the combined predicted importance based upon the user profile importance and the predicted importance based upon one of an ensemble function and an aggregation function.

13. The method of claim 9 wherein using the processor comprises using the processor to generate the prioritization of the new report by calculating an importance weight for the new report by combining a reciprocal of the predicted completion time for the new report and the predicted importance.

14. One or more computer readable media for cognitive prioritization for report generation collectively comprising computer executable instructions that when executed by a processor cause the processor to perform operations comprising:
  accepting a request for a new report from a user, the request having a user profile importance associated therewith and a user comment indicating a reason for requesting the new report;
  generating a predicted completion time for the new report by a historical completion time prediction model trained using historical data for prior reports;
  generating a predicted importance of the new report based upon the reason for requesting the new report by a historical importance prediction model including a text mining model trained using the historical data for prior reports, wherein the historical data for prior reports includes user comments indicating reasons for requesting the prior reports and corresponding labeled importance;
  determining a combined predicted importance based upon the user profile importance and the predicted importance;
  determining that the user misstated importance of the new report in the reason for requesting the new report and adjusting the predicted completion time for the new report to lower a prioritization of the new report by:
    determining a number of attempts of the user to misstate importance of the new report and the prior reports in the reason for requesting the new report in the user comment for the new report and in the reasons for requesting the prior reports in the user comments for the prior reports;
    determining a delay based on the number of attempts of the user to misstate importance of the new report and the prior reports, wherein the delay increases as the number of attempts increases; and
    adding the delay to the predicted completion time to indicate a later time for completion of the new report;
  generating the prioritization of the new report among a plurality of other reports based upon the predicted completion time and the combined predicted importance; and
  controlling wait times for users for the report generation according to report urgency, wherein controlling the wait times includes:
    using differing amounts of computing and memory resources of the processor and a memory for the report generation in a resource constrained environment having computing and memory resource capacities, wherein the amount of computing and memory resources used is according to an order of the prioritization of the new report and the plurality of other reports; and
    generating the new report and the plurality of other reports in the resource constrained environment in the order according to the prioritization using the differing amounts of the computing and memory resources.

15. The one or more computer readable media of claim 14 wherein the historical completion time prediction model comprises a multi-variable regression model trained on historical reports each having associated completion times.

16. The one or more computer readable media of claim 15 wherein attributes of the multi-variable regression model comprise user-chosen values for each of a plurality of usable filters for generation of the new report, available system resources for the new report generation, and demand queue size at a time of the request for the new report.

17. The one or more computer readable media of claim 14 wherein the operations comprise determining the combined predicted importance based upon the user profile importance and the predicted importance based upon one of an ensemble function and an aggregation function.

18. The one or more computer readable media of claim 14 wherein the operations comprise determining the prioritization of the new report by calculating an importance weight for the new report by combining a reciprocal of the predicted completion time for the new report and the predicted importance.

* * * * *